United States Patent [19]

Nishimura et al.

[11] Patent Number: 4,796,088
[45] Date of Patent: Jan. 3, 1989

[54] NOISE REDUCER USING MAGNITUDE OF NOISE AND NON-LINEAR SIGNAL PROCESSING

[75] Inventors: Naruto Nishimura, Hirakata; Junji Sato, Katano, both of Japan

[73] Assignee: Sanyo Electric Co., Ltd., Osaka, Japan

[21] Appl. No.: 51,356

[22] Filed: May 19, 1987

[30] Foreign Application Priority Data

May 20, 1986 [JP] Japan ............................. 61-116911

[51] Int. Cl.[4] ............................................. H04N 5/213
[52] U.S. Cl. ................................... 358/167; 358/166
[58] Field of Search ....................... 358/167, 166, 36

[56] References Cited

U.S. PATENT DOCUMENTS

| 4,240,106 | 12/1980 | Michael et al. | 358/167 X |
| 4,242,704 | 12/1980 | Ito et al. | 358/167 |
| 4,242,705 | 12/1980 | Ebihara | 358/36 X |
| 4,246,610 | 1/1980 | Tokahashi | 358/167 |
| 4,249,209 | 2/1981 | Storey | 358/167 |
| 4,249,210 | 2/1981 | Storey et al. | 358/167 |
| 4,268,855 | 5/1981 | Takahashi | 358/167 X |
| 4,275,186 | 6/1981 | Trunys et al. | 358/167 |
| 4,296,436 | 10/1981 | Achiha | 358/167 |
| 4,361,853 | 11/1982 | Remy et al. | 358/167 |
| 4,494,140 | 1/1985 | Michael | 358/167 X |
| 4,500,911 | 2/1985 | Ninomiya et al. | 358/36 |
| 4,729,019 | 3/1988 | Rouvrais | 358/166 X |
| 4,748,498 | 5/1988 | Yamanishi et al. | 358/166 X |

FOREIGN PATENT DOCUMENTS 55-37018 3/1980 Japan .
57-193179 11/1982 Japan .

OTHER PUBLICATIONS

"Digital Signal Processing", Daily Industrial News, May 25, 1981, pp. 115–118.

Primary Examiner—James J. Groody
Assistant Examiner—E. Anne Faris
Attorney, Agent, or Firm—Armstrong, Nikaido, Marmelstein & Kubovcik

[57] ABSTRACT

A level difference detecting circuit 9 and an integrating circuit 10 receive a digital image signal inputted from an image signal input terminal 1 and detect a magnitude during a constant level period in every field. A determining circuit 12 determines the magnitude of the detected noise and selects the kind of a non-linear parameters to be used in a digital filter 8. Therefore, the digital filter 8 always performs processing for reducing noise by the most suitable non-linear parameter in accordance with the magnitude of noise.

11 Claims, 3 Drawing Sheets

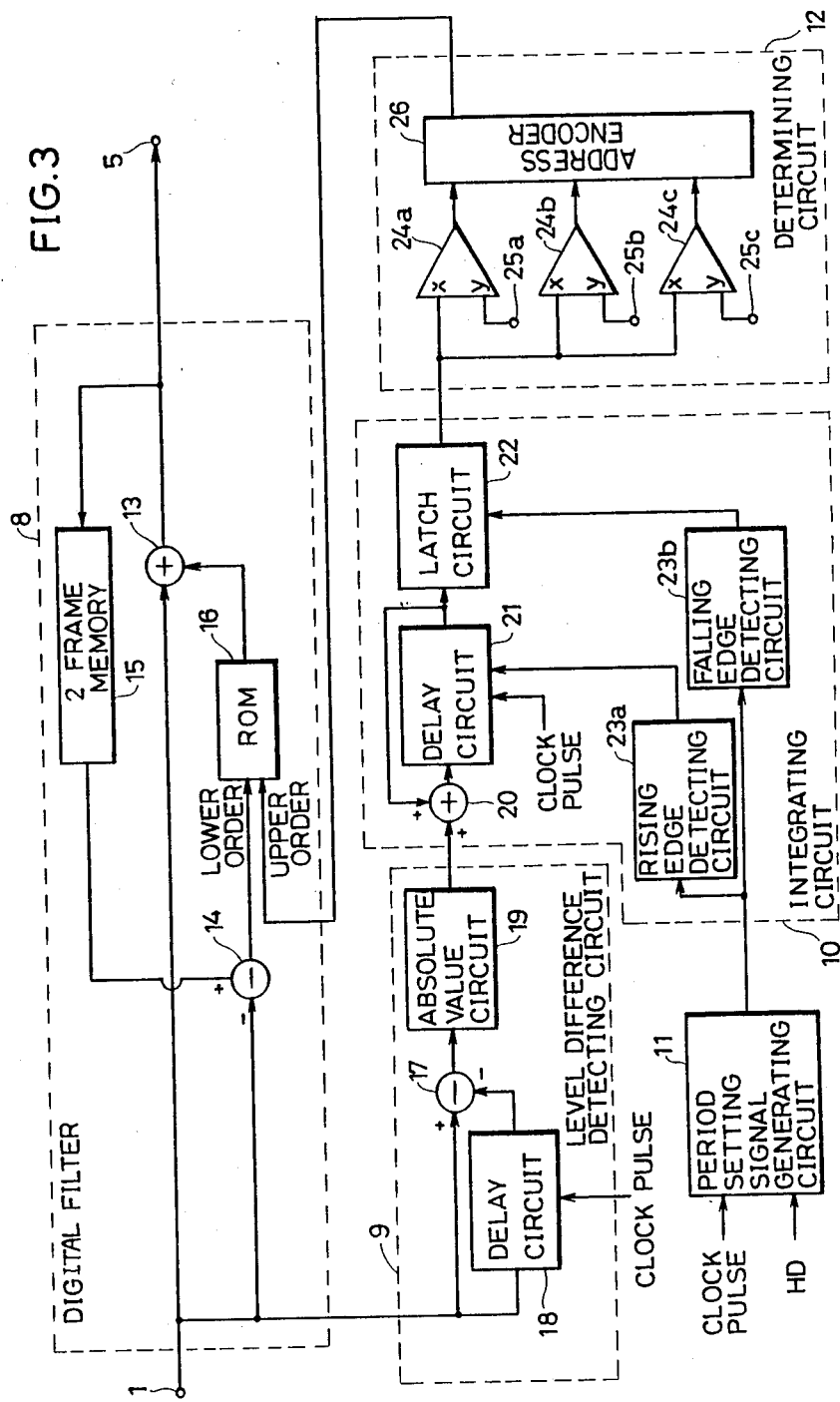

even if the image is a moving picture signal is small and hence, the parameter K is increased.

NOISE REDUCER USING MAGNITUDE OF NOISE AND NON-LINEAR SIGNAL PROCESSING

BACKGROUND OF THE INVENTION

1. Field of the Invention

The present invention relates to a noise reducer and more particularly, to a noise reducer for reducing noise included in a digital image signal.

2. Description of the Prior Art

Conventionally, satellite broadcasting of television signals of an NTSC system has been performed utilizing radio waves of an SHF band.

Furthermore, it has been proposed that a new high-definition television receiver of a band reduction system developed by the Science and Technical Research Laboratories in Japan Broadcasting Corporation also receives high-definition television signals by satellite broadcasting.

The television receiver of an NTSC system which receives television signals of an NTSC system by satellite broadcasting and the high-definition television receiver which receives high-definition television signals by satellite broadcasting are adapted such that the received analog broadcasting signal is converted into a digital image signal and is processed in a digital manner.

On the other hand, in the field of processing of a digital image signal, a noise reducer utilizing a digital filter has been proposed in order to reduce noise included in an image signal. The noise reducer detects a signal for indicating the level difference between frames of the image signal and provides non-linear filter processing to the image signal in response to the level difference signal. For example, the noise reducer with a structure shown in FIG. 1 is described in "Digital Signal Processing of Image" (published by the Daily Industrial News, May 25, 1981), pp. 115–118.

In FIG. 1, a digital image signal of m parallel bits is supplied to an image signal input terminal 1 sequentially for one sample. The image signal input terminal 1 is connectdd to one input terminal of an adder 2 and a negative input terminal of a subtracter 3. The digital image signal of m bits output from the adder 2 is applied to a frame memory 4 and an image signal output terminal 5. The frame memory 4 delays the input image signal by one or several frames, the output thereof being applied to a positive input terminal of the subtracter 3. Thus, the subtracter 3 subtracts the image sigaal supplied from the image signal input terminal 1 from the image signal supplied from the frame memory 4 and outputs the same. An output of the the subtracter 3 is applied to a read-only memory (referred to as a ROM hereinafter) 6. In the ROM 6, a value which is K ($0 \leq K < 1$) times the level value of an output signal of the subtracter 3 is previousl written into each address designated by the level of the output signal of the subtracter 3. As described below, the parameter K is a non-linear parameter which changes in accordance with the level value of the output signal of the subtracter 3. Thus, the ROM 6 outputs a signal of m bits for reducing noise, which signal corresponds to K times of the level value of the output signal of the subtracter 3. The signal of m bits for reducing noise is applied to the other input terminal of the adder 2.

The above described adder 2, the subtracter 3, the frame memory 4 and the ROM 6 constitute a digital filter 7 of a recursive structure type.

Description is now made on operation of the circuit in FIG. 1.

The level difference between the image signal input from the image signal input terminal 1 and an image signal which was delayed by, for example, one frame, by the frame memory 4 (that is, an image signal one frame before) is determinated by the subtracter 3. Thus, the level difference signal between frames of the image signal is output from the subtracter 3 and is applied to the ROM 6. In the ROM 6, address is designated in accordance with the absolute value of the level of the level difference signal and a value which is K times the absolute value is read out. In addition, in the ROM 6, a sign ($+$ or $-$) of an input signal (level difference signal) is added to the value which is K times the absolute value and then, the result is output to the adder 2. In the adder 2, the image signal input from the image signal input terminal 1 is added to the output signal of the ROM 6 and a digital image signal having reduced noise is output. The digital image signal having reduced noise is output to the image signal output terminal 5.

The above described example utilizes the fact that the image signal shows a strong correlation between frames. For example, if the image signal supplied to the image signal input terminal 1 is a still picture signal, the image signal one frame before and the current image signal coincide with each other. Therefore, the output signal of the subtracter 3, i.e., the level difference signal is an extracted noise component superposed on the image signal (having inverted polarity). When the level difference signal is multiplied by K in the ROM 6 and the result is added to the image signal from the image signal input terminal 1 in the adder 2, an image signal having reduced noise by averaging noise with respect to time is obtaihed in the image signal output terminal 5.

As described in the foregoing, if the image signal input from the image signal input terminal 1 is a still picture signal, the level difference signal of the subtracter 3 is a signal including a noise component having inverted polarity. Therefore, the larger the parameter K is, the larger the effect for reducing noise is, so that the noise level of the image signal output from the image signal output terminal 5 becomes low.

On the other hand, if the image signal inputted from the image signal input terminal 1 is a moving picture signal, the correlation between frames becomes weak, so that the level of the level difference signal from the subtracter 3 largely changes due to movement of an image between frames. In this case, if the parameter K is set to a large constant value irrespective of the level of the level difference signal in order to increase the effect for reducing noise components, the level change of the image signal due to movement of the image is averaged with respect to time. Therefore, the image signal obtained from the image signal output terminal 5 becomes a signal having blurred profile of the moving picture portion, so that the picture quality is deteriorated.

Therefore, conventionally, the above described parameter K has been changed in accordance with a preset characteristic depending on the magnitude of the absolute value of the level of the level difference signal of the subtracter 3. More specifically, when the absolute value of the level of the level difference signal becomes large, it is considered that the image moves and hence, the parameter K is decreased. On the other hand, when the absolute value of the level of the level difference signal becomes small, it is considered that the change is caused by noise and thus the parameter K is increased. Then, the non-linear filter processing of the image signal input from the image signal input terminal 1 is made. As a result, the quality of the moving picture is prevented from deteriorating, so that noise can be reduced.

The change characteristic of the parameter K is set in trial and error manner, so that the value of the parameter K in the latter case is generally set to 0.5–0.8.

In a digital image processing apparatus such as a television receiver which receives satellite broadcasting, the noise reducer shown in FIG. 1 or almost the same noise reducer as the noise reducer (for example, a noise reducer comprising a combinational logic circuit substituted for the ROM 6 or a noise reducer comprising a ROM having smaller capacitance than that of the ROM 6 and the combination logic circuit) is provided in order to reduce noise of the digital image signal of the received broadcasting signal.

In a television receiver of an NTSC system which receives a television signal of an NTSC system by satellite broadcasting, the arrangement of picture elements is the same in each frame, so that the frame memory 4 is formed of a memory having storage capacitance of one frame (=two fields). On the other hand, in a high-definition television receiver which receives a high-definition television signal by satellite broadcasting, the arrangement of picture elements is the same only for every two frames, so that the frame memory 4 is formed of a memory having storage capacitance of two frames (=four fields).

When the noise reducer in FIG. 1 is provided in the television receiver, an image signal and the noise level largely change depending on the receiving state or the like, so that the following problems occur. More specifically, when the change characteristic of the parameter K is set to, for example, a characteristic of surely preventing a blur of a moving picture, that is, a characteristic in which the parameter K is decreased at a relative low level of the level difference signal, a value of the parameter K becomes small when the magnitude of noise is increased due to deterioration of the receiving state or the like, considering that the change is caused by movement of the image, so that noise is not liable to be satisfactorily reduced. On the other hand, when the change characteristic of the parameter K is set to a characteristic of surely reducing noise, that is, a characteristic in which the parameter K is increased to a relatively high level of the level difference signal, the moving picture is liable to be remarkably blurred. Thus, in the noise reducer in FIG. 1, it was difficult to set the change characteristic of the parameter K to the best characteristic in accordance with the receiving state or the like.

Particularly, in the television receiver which receives the television signal by satellite broadcasting, C/N (carrier power/noise) of a received signal changes depending on the weather condition. For example, since in rainy weather, C/N becomes lower than that in fine weather, the receiving state is deteriorated, so that it is remarkably difficult to set the change characteristic of te parameter K.

Furthermore, in satellite broadcasting of the high-definition television signal, the base bandwidth is larger than that of the conventional satellite broadcasting of an NTSC system, so that it is difficult to widen deviation of FM modulation of broadcasting signals. Thus, even if C/N of the received broadcasting signal is the same as that of the broadcasting signal of satellite broadcasting of an NTSC system, the magnitude of noise relative to a demodulated image signal is larger than that of a demodulated broadcasting signal of satellite broadcasting signal of satellite broadcasting of an NTSC system. Therefore, in the noise reducer provided in the high-definition television receiver which receives the high-definition television signal by satellite broadcasting, it is further difficult to set the change characteristic of the parameter K.

When the high-definition television signal by satellite broadcasting is received and processed, it is most important to make a reproduced image high quality, so that the noise reducer must satisfactorily reduce noise at the some sacrifice of the blur due to movement of the image.

On the other hand, Japanese Patent Laying-Open Gazette No. 37018/1980 or No. 193179/1982 describes a noise reducer in which a moving vector detecting circuit for detecting movement of an image and a moving vector correcting circuit for vector-correcting an image signal output, for example, from the frame memory 4 to the subtracter 3 by a detection signal of the moving vector detecting circuit are added to the structure of the noise reducer in FIG. 1. The noise reducer corrects deviation between the image signal output, for example, from the frame memory 4 to the subtracter 3 and the image signal input from the image signal input terminal 1 relative to the moving portion, so that effect of the moving portion to the level difference signal of the subtracter 3 may be decreased. Thus, the change characteristic of the parameter K is set to a characteristic in which a value of the parameter K becomes relatively large when the level of the level difference signal becomes large, so that the above described problem can be solved.

However, in the above described moving vector detecting circuit and the moving vector correcting circuit, the structures thereof are complicated and large-sized, and it is difiicult to surely make correction. Therefore, there occurs a new problem that when the moving vector detecting circuit and the moving vector correcting circuit are added, the noise reducer becomes complicated and large-sized. In addition, there is also a problem that when connection was not suitably made, noise can not be satisfactorily reduced.

SUMMARY OF THE INVENTION

Therefore, a primary object of the present invention is to provide a noise reducer having a simple and inexpensive structure, in which noise can be satisfactorily reduced while controlling a blur of the moving portion of an image as much as possible, without using a moving vector detecting circuit, a moving vector correcting circuit or the like.

Briefly stated, according to the present invention, the magnitude of noise in a digital image signal during a predetermined period is detected, the most suitable parameter is selected from a plurality of kinds of non-linear parameters in accordance with the detected magnitude of noise, and noise is reduced in response to the selected non-linear parameter in the digital filter.

According to the present invention, since noise is always reduced in response to the most suitable non-linear parameter in the digital filter, so that noise can be satisfactorily reduced without any difficulty which was encountered conventionally in setting th non-linear parameter. In addition, since the conventional complicated and large-sized circuit such as the moving vector detecting circuit and the moving vector correcting circuit is not used, a noise reducer having a simple and small-sized structure and high performance can be obtained.

These objects and other objects, features aspects and advantages of the present invention will become more apparent from the following detailed description of the present invention when taken in conjunction with the accompanying drawings.

BRIEF DESCRIPTION OF THE DRAWINGS

FIG. 3 is a block diagram showing the embodiment in FIG. 2 in more detail;

DETAILED DESCRIPTION OF THE PREFERRED EMBODIMENTS

Figure 2:
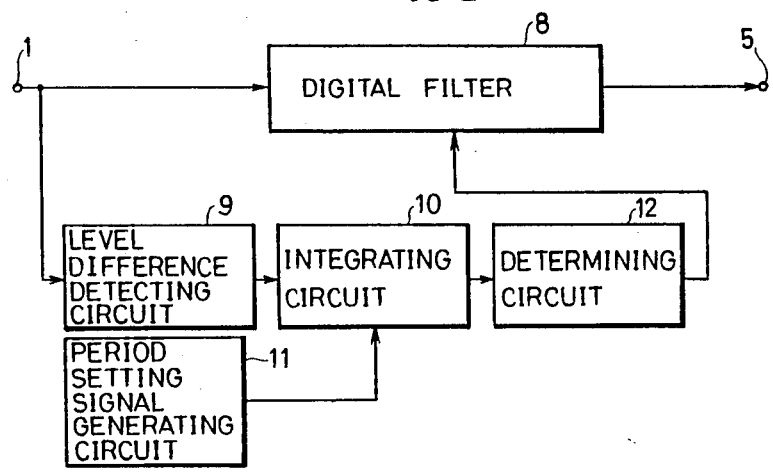
FIG. 2 is a block diagram showing an embodiment of the present invention.

Referring now to FIGS. 2 and 3, description is made on an embodiment of the present invention.

Figure 1:
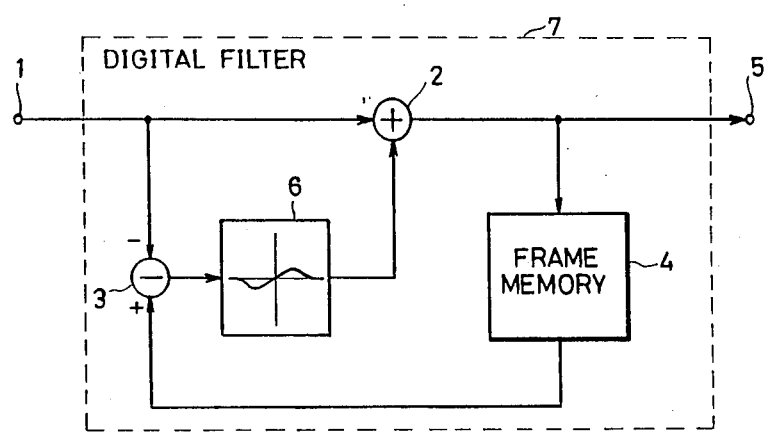
FIG. 1 is a block diagram showing a example of a conventional noise reducer.

FIG. 2 shows an embodiment of a noise reducer used in a high-definition television receiver which receives high-definition television signals by satellite broadcasting. In FIG. 2, the image signal input terminal 1 is supplied with a digital image signal having m bits (for example, eight bits) in parallel. The digital image signal is input sequentially for one sample and is applied to a digital filter 8. The digital filter 8 is of a recursive structure type, similarly to the digital filter in FIG. 1. In addition, the digital image signal input from the image signal input terminal 1 is applied to the level difference detecting circuit 9. The level difference detecting circuit 9 detects in a digital manner the absolute value of the level difference between an image signal of one sample which is currently input and an image signal of one sample which was input one sample before and outputs a digital signal corresponding to the absolute value of the level difference. An output signal of the level difference detecting circuit 9 is applied to an integrating circuit 10. The integrating circuit 10, together with the level difference detecting circuit 9, constitutes a noise detecting means. A period setting signal is applied from a period setting signal generating circuit 11 to the integrating circuit 10. The period setting signal defines a constant level period which exists in every field of the image signal (as described below). The integrating circuit 10 integrates in a digital manner the output signal of the level difference detecting circuit 9 in response to the period setting signal during a constant level period in every field, thereby outputting a detecting signal indicating the magnitude of noise in every field. An output signal of the integrating circuit 10 is applied to a determining circuit 12. The determining circuit 12 compares in a digital manner a plurality of reference levels for determining a level which are set therein with the level of the output signal of the integrating circuit 10 and outputs a determination signal of the magnitude of noise to the digital filter 8.

Figure 4:
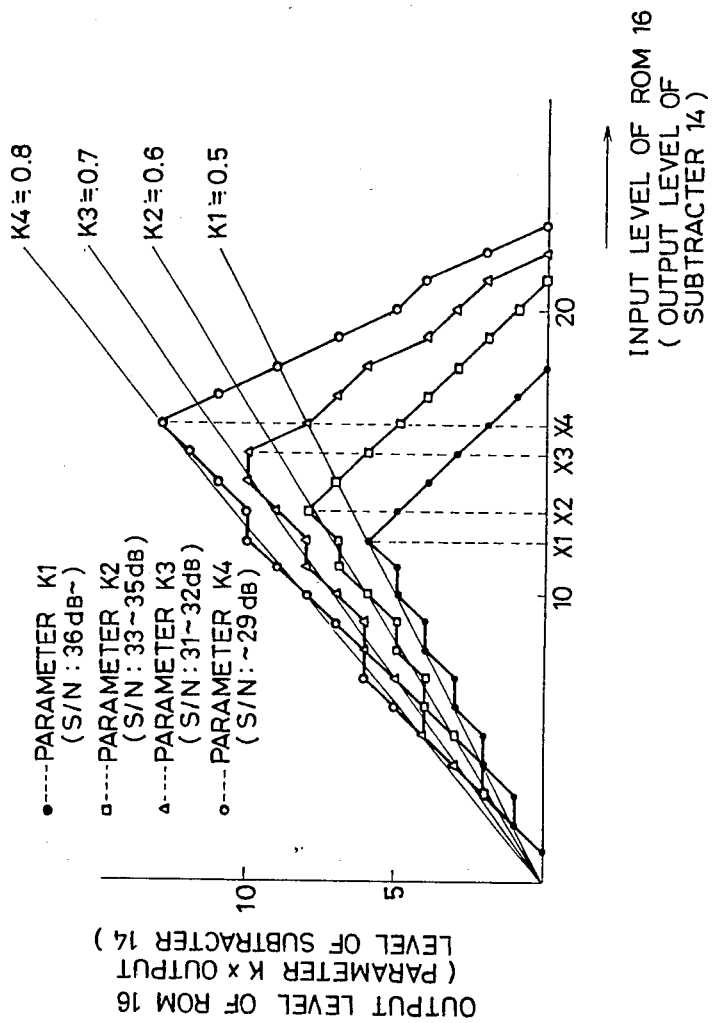
FIG. 4 is a graph showing the relation between an input and an output of a ROM 16 shown in FIG. 3.

Referring now to FIG. 3, description is made on the structure of the embodiment in FIG. 2 in more detail. In FIG. 3, the digital filter 8 comprises an adder 13, a subtracter 14, a two-frame memory 1 and a ROM 16, similarly to the digital filter 7 in FIG. 1. In the digital filter 8, the connection between internal circuits is the same as that in the digial filter 7 in FIG. 1. The digital filter 8 differs from the digital filter 7 in FIG. 1 in that the lower order address of the ROM 16 is designated by a level difference signal output from the subtracter 14 and the higher order address of the ROM 16 is designated by the determination signal output from the determining circuit 12. In addition, as shown in FIG. 4, the products of the levels of the output signal of the subtracter 14 and each of, for example, four kinds of non-linear parameters K1 to K4 are set to the ROM 16. The above described higher order address designates which one of four kinds of non-linear parameters K1 to K4 is to be used and the above described lower order address designates the product corresponding to the level of the output signal of the subtracter 14. The two-frame memory 15 is adapted such that an image signal is delayed by two frames because the noise reducer is adapted to a high-definition television receiver which receives television signals by satellite broadcasting. Furthermore, the adder 13 and the subtracter 14 are adapted such that an image signal of m parallel bits can be processed.

The level difference detecting circuit 9 includes a subtracter having m bits connected in parallel, a delay circuit 18 and an absolute value circuit 19. The delay circuit 18 comprises, for example, m D type flip-flops which are connected in parallel. A corresponding bit in the image signal from the image signal input terminal 1 is applied to a data input terminal of each D type flip-flop and a clock pulse for defining a sampling period of the image signal is applied to each clock terminal. The delay circuit 18 delays the input image signal by one sample period and outputs the same. In the subtracter 17 having m bits connected in parallel, the corresponding bit in the image signal from the image signal input terminal 1 is applied to a positive terminal of each bit and a corresponding bit output in the delay circuit 18 is applied to a negative terminal of each bit. An output of the subtracter 17 is applied to the absolute value circuit 19. The absolute value circuit 19 comprises, for example, the ROM, where the absolute value of the level of the output signal of the subtracter 17 is set to each address designated depending on the level of the output signal of the subtracter 17. Thus, the absolute value 19 detects th positive absolute value of the output signal of the subtracter 17 and outputs the same.

The integrating circuit 10 comprises an adder 20 having n bits connected in parallel (for example, in the case of m=8 bits, n>14), a delay circuit 21, a latch circuit 22, a rising edge detecting circuit 23a and a falling edge detecting circuit 23b. The adder 20 has one terminal receiving an output of the absolute value circuit 19 and other terminal receiving an output of the delay circuit 21. The delay circuit 21 comprises, for example, n D type flip-flops which are connected in parallel. Each D type flip-flop has a data input terminal receiving a corresponding bit output in the adder 20, a clock terminal receiving the same clock pulse as that applied to the above described delay circuit 18, and a clear terminal receiving an output of the rising edge detecting circuit 23a. The delay circuit 21 delays an output of the adder 20 for one sample period and outputs the same. The output of the delay circuit 21 is applied to the other terminal of the adder 20 as described above, and is applied to the latch circuit 22. The latch circuit 22 comprises, for example, n flip-flops which are connected in parallel. Each flip-flop has a clear terminal receiving an output of the falling edge detecting circuit 23b. The rising edge detecting circuit 23a and the falling edge detecting circuit 23b detect the rising edge and the falling edge of the period setting signal output from the period setting signal generating circuit 11, respectively, each comprising a delay circuit for delaying the above described period setting signal by, for example, one sample period and an exclusive OR circuit receiving an output of the delay circuit and the period setting signal as inputs.

The determining circuit 12 comprises three comparators 24a, 24b and 24c, an address encoder 26 for encoding outputs of the comparators 24a, 24b and 24c. Each of the comparators 24a, 24b and 24c comprises a comparator of n parallel bits so that an output of n parallel bits of the latch circuit 22 may be processed. Each of the comparators 24a, 24b and 24c had one terminal x receiving the output of the latch circuit 22 and other terminal y receiving reference signals having different level from reference signal input terminals 25a, 25b and 25c. Each of the comparators 24a, 24b and 24c is adapted such that when a level of the signal input to the one terminal x is larger than that of the reference signal input to the other terminal y, the output thereof attains a high level, whereas when the level of the reference signal is larger, the output thereof attains a low level.

Figure 5:
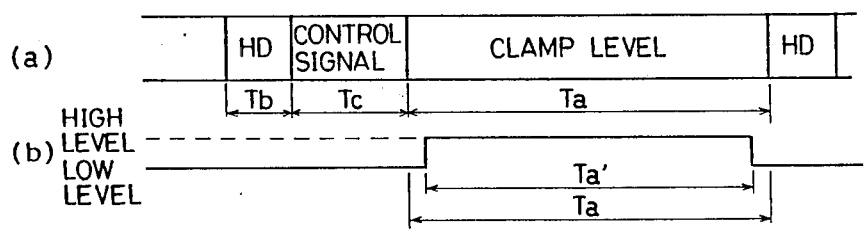
FIG. 5 is a timing chart for explaining operation according to the embodiment shown in FIGS. 2 and 3.

Referring now to a timing chart in FIG. 5, description is made on operation according to the above described embodiment.

In satellite broadcasting of the high-definition television signal, an image signal of a base band is compressed in its bandwidth by sub-Nyquist sampling in which a cycle comprises four fields and the image signal formed by bandwidth compression is FM-modulated and is sent. At that time, a broadcasting signal has a field having the identical picture element arrangement for every period of two frames (four fields) and a clamp level period Ta set to a constant level for a predetermined line period (line period of a line number 563 or 1125) in every field, as shown in FIG. 5a. The clamp level period Ta is set to a transmission sample rate with 16.2 MHz, that is, a sample period corresponding to 374 clock pulses, so that data having an intermediate level (50%) between a white level and a black level, that is, data having a clamp level defining a DC level for a receiving processing is transmitted during the period Ta. In FIG. 5(a), a period Tb is a period of a horizontal synchronizing signal and a period Tc is a period of a control signal.

A digital image signal in every field formed by receiving processing and digital conversion processing of the high-definition television signal is input sequentially for one sample from the image signal input terminal 1 to the digital filter 8 and the level difference detecting circuit 9 in synchronization with a clock pulse. At that time, in the level difference detecting circuit 9, the inputted image signal is delayed, by one sample period, by the delay circuit 18. In addition, the level difference between the image signal input from the image signal input terminal 1 and an image signal one sample before output from the delay circuit 18, that is, the level difference of the image signal between adjacent samples is determined in a digital manner by the subtracter 17. Furthermore, the output signal of the subtracter 17 is converted into a signal of data having the absolute value by the absolute value circuit 19.

The output signal of the absolute circuit 19 is output to the delay circuit 21 through the adder 20. The delay circuit 21 delays the output of the adder 20 by one sample period and returns to the adder 20. Thus, the adder 20 adds the current input from the absolute value circuit 19 to an output signal of the adder 20 one sample before. The output signal of the absolute value circuit 19 is integrated and added in a digital manner by the adder 20 and the delay circuit 21.

In the above described clamp level period Ta in every field, since the level of the image signal from the image signal input terminal 1 is the same in each sample, the magnitude of noise in every field is detected from the output signal of the delay circuit 21 which is the result of the above described integration and addition.

Immediately before and after the clamp level period Ta, transient variation (ringing) is liable to occur in the image signal from the image signal input terminal 1 by factors other than noise. In order to prevent the effect of such ringing, the integrating circuit 10 detects the noise level under integration only during a constant level period Ta' corresponding to the clamp level period Ta excluding the start portion and the end portion, as described below.

The period setting signal output from the period setting signal generating circuit 11 is formed as a signal which is at a high level only during the above described constant level period Ta' (see FIG. 5(b)). The period setting signal generating circuit 11 is, for example, reset by the horizontal synchronizing signal HD and outputs such period setting signal by counting clock pulses.

The rising edge detecting circiit 23a detects the rising edge of the above described period setting signal and outputs a rising edge detecting pulse at the start of the constant level period Ta'. The rising edge detecting pulse is applied to a clear terminal of the delay circuit 21. Accordingly, each of the D type flip-flops constituting the delay circuit is cleared and reset, so that all the output signals become zero. On the other hand, the falling edge detecting circuit 23b detects the falling edge of the above described period sttting signal and outputs a falling edge detecting pulse at the end of the constant level period Ta'. The latch circuit 22 operates for each falling edge of the above described period setting signal in response to the falling edge detecting pulse.

Therefore, the delay circuit 21 starts integration and addition at the start of the constant level period Ta' in every field and the output signal of the delay circuit 21 is latched to the latch circuit 22 at the end of the constant level period Ta'. Thus, the output signal of the latch circuit 22 is an integration signal during the constant level period Ta' in every field, that is, a detection signal at a noise level.

The latch circuit 22 falls the latched detection signal to the end of the constant level period Ta' in the subsequent field. The detection signal of the latch circuit 22 is input to the determining circuit 12.

In the determining circuit 12, the output signal of the latch circuit 22 is applied to each of the comparators 24a, 24b and 24c. Each of the comparators 24a, 24b and 24c compares the level of each of the reference signals each applied to reference signal input terminals 25a, 25b and 25c with the level of the output signal of the latch circuit 22. As a result of comparison, each of the comparators 24a, 24b and 24c outputs a determination signal of one bit, which attains a high level when the level of the output signal of the latch circuit 22 is higher than that of the reference signal, and which attains a low level when the level of the reference signal is higher.

The determination signal is applied to the address encoder 26 and is converted into an address signal for designating the higher order address of the ROM 16.

On the other hand, data concerning the products of four kinds of non-linear parameters K1 to K4 and the level of the output signal of the subtracter 14 are set to the ROM 16, as described above. FIG. 4 is a graph showing the relation between an input and an output of the ROM 16, where the axis of abscissa corresponds to the input of the ROM 16, that is, the magnitude of the absolute value of noise output from the subtracter 14 (strictly, the ratio of the magnitude of noise to the maximum value of the input image signal), and the axis of ordinate corresponds to the output of the ROM 16, that is, the product of the absolute value of the magnitude of noise and the parameter K (strictly, the ratio of the product to the maximum value of the input image signal). The parameter K1 is most suitable for low noise such as in fine weather and parameter K4 is most suitable for high noise such as in rainy weather.

As shown in FIG. 4, the input and output change characteristic of the ROM 16 is set in a cone-shape which rises when the absolute value of the magnitude of noise (the axis of abscissa) becomes larger and falls when the absolute value of the magnitude of noise attains a certain value, with respect to each of the parameters K1 to K4. The reason is that the parameter K is increased while the absolute value of the magnitude of noise is relatively small, that is, until the absolute value attains the above described certain value, considering that the change is caused by noise, so that the effect for reducing noise is increased, whereas the parameter K is decreased when the absolute value of the magnitude of noise exceeds a certain value, considering that the image moves, so that the effect for reducing noise is controlled and a blur of the image is prevented. The magnitude of the product in the identical position on the axis of abscissa in FIG. 4 corresponds to the magnitude of each parameter K, so that the parameters K1 to K4 have the relation of $K1<K2<K3<K4$. For example, until the absolute value of the magnitude of noise attains a certain value, that is, until the product attains the peak from 0, the values $K1\approx0.5$, $K2\approx0.6$, $K3\approx0.7$ and $K4\approx0.8$ are selected according to the present embodiment. The reason is that the value of the parameter K is set small at the time of low noise such as in fine weather so that the effect for reducing noise is controlled and a blur of an image is controlled as much as possible. On the other hand, at the time of high noise such as in rainy weather, the value of the parameter K is set large so that the effect for reducing noise is increased and deterioration of the image quality due to noise is controlled as much as possible. In addition, the input and output change characteristic of the ROM 16 corresponding to each of the parameters K1 to K4 is that the position of each peak slightly deviates in the direction of the axis of abscissa in FIG. 4. More specifically, assuming that the positions in the direction of the axis of abscissa of the peaks relative to the parameters K1, K2, K3 and K4 are set to x1, x2, x3 and x4, respectively, the relation of $x1<x2<x3<x4$ is obtained. The reason is that when higher noise is produced as in rainy weather, the value of the parameter K, that is, the effect for reducing noise is held to the high noise level so that deterioration of the image quality due to noise is prevented. As described above, the product data based on a plurality of kinds of non-linear parameters K1 to K4 depending on the receiving state (at the time of low noise or high noise) are set. At the time of low noise, the non-linear parameters K1 to K4 aim at preveting a blur of the moving picture rather than deterioration of the image quality due to noise, whereas at the time of high noise, the parameters K1 to K4 aim at preventing deterioration of the image quality due to noise.

In the ROM 16, the higher order address is designated by an address signal output from the address encoder 26 of the determining circuit 12 and it is determined which of the product data based on the parameters is to be used. For example, at the time of low noise such as in fine weather, the product data based on the parameter K1 is selected. When the magnitude of noise determined by the determining circuit 12 becomes larger, the product data based on the parameter K2, the product data based on the parameter K3 and the product data based on the parameter K4 are selected in this order. Therefore, in the digital filter 8, the image signal is processed in response to the suitable paramete K depending on the receiving state.

More specifically, in the digital filter 8, the level difference signal between frames is output from the subtracter 14 to the ROM 16 in response to the image signal input from the image signal input terminal 1 and an image signal two frames before output from the two frame memory 15. The lower order address of the ROM 16 is designated by the level difference signal from the subtracter 14. More specifically, the product data corresponding to the level of the level difference signal is designated in accordance with the input and output change characteristic of a parameter selected by the address signal from the determining circuit 12. The ROM 16 outputs the designated product data, that is, data which is K times the level of the level difference signal to the adder 13. The adder 13 adds the image signal input from the image signal input terminal 1 to the output of the ROM 16, so that the noise component superposed on the image signal is reduced and is output to the image signal output terminal 5.

As described in the foregoing, according to the embodiment in FIG. 3, since the parameters K1 to K4 are switched depending on the magnitude of noise in the digital image signal during the constant level period so that processing for reducing noise is made, the most suitable processing for reducing noise can be always made irrespective of variation of the receiving state. More specifically, in fine weather having little noise, the effect for reducing noise of the digital filter 8 is controlled, as compared with in rainy weather and a blur of the moving portion is controlled as much as possible so that noise is satisfactorily reduced. On the other hand, in rainy weather causing much noise, the effect for reducing noise of the digital filter 8 is strengthened, so that noise can be surely reduced. Therefore, according to the present embodiment, a noise reducer having a simple and small-sized structure and high performance can be obtained without using a complicated and large-sized circuit such as a moving vector detecting circuit and a moving vector correcting circuit.

Although in the above described embodiment, the product data is set to the ROM 16 with respect to four kinds of parameters K1 to K4, the number of kinds of the parameters K may be 2, 3 or more than 5. In this case, when the number of kinds of the parameters K is increased, processing for reducing noise can be further subdivided, so that noise can be satisfactorily reduced. When the number of kinds of the non-linear parameters K set to the ROM 16 is set to i, the determining circuit 12 comprises (i−1) comparators 24a, 24b, ... of the number which is one smaller than the number of kinds of the non-linear parameters K and the address encoder 26. In the case of i =2, it is necessary that an output of the comparator 24a is directly applied to the ROM 16, so that the address encoder 26 is not required. Furthermore, the ROM 16 may also comprise a combinational logic circuit, or a ROM having smaller capacitance than that of the ROM 16 and the combinational logic circuit.

Additionally, the present invention can be applied to various digital image apparatuses other than the high-definition television receiver which receives high-definition television signals by satellite broadcasting.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A noise reducer for reducing noise included in a digital image signal, said digital image signal being input for every sample, said noise reducer comprising:
    a digital filter for reducing noise in the digital image signal, by detecting for every sample a level difference signal between frames of said digital image signal, by processing said detected level difference signal in a non-linear manner in response to a kind of non-linear parameter selected from a predetermined plurality of kinds of non-linear parameters, and by providing a predetermined arithmetic processing to said digital image signal in according with an output signal processed in said non-linear manner, said digital filter including a level difference arithmetic means for detecting a level of the level difference signal between frames and for performing non-linear processing of the level difference signal between frames in accordance with one non-linear parameter selected from the predetermined plurality of kinds of non-linear parameters;
    noise detecting means for detecting an amount of noise during a predetermined period of at least one frame of said digital image signal; and
    parameter selecting means for determining a magnitude of noise detected by said noise detecting means for selecting the kind of non-linear parameters to be used in said digital filter in response to results of the determination.

2. A noise reducer in accordance with claim 1, wherein
    said digital filter comprises:
    delay means for delaying, by a period of one or more frames, a digital image signal from which noise was reduced, which is an output of the digital filter,
    non-linear processing means, having preset data corresponding to said plurality of kinds of non-linear parameters, for providing a predetermined non-linear processing to an output of said level difference arithmetic means in response to data corresponding to a kind of non-linear parameter selected by said parameter selecting means, and
    arithmetic processing means responsive to an output of said non-linear processing means for providing a predetermined arithmetic processing to the digital image signal from which noise is not reduced so that noise included in the digital image signal may be reduced.

3. A noise reducer in accordance with claim 2, wherein
    said non-linear processing means multiplies said selected kind of non-linear parameter by the output of said level difference arithmetic means, as said non-linear processing.

4. A noise reducer in accordance with claim 3, wherein
    said non-linear processing means comprises memory means in which product data of each non-linear parameter and the output of said level difference arithmetic means is preset and stored, as said data corresponding to said plurality of kinds of non-linear parameters,
    said memory means receiving an output of said parameter selecting means as an address signal for selecting the kind of said non-linear parameters and an output of said level difference arithmetic means as an address signal for designating product data corresponding to the output of the level difference arithmetic means.

5. A noise reducer in accordance with claim 4, wherein
    said memory means stores product data preset corresponding to said non-linear parameters of more than i (i≧3) kinds, and
    said parameter selecting means comprises
        (i−1) comparators, having set different reference levels, respectively, for comparing the magnitude of the output of said noise detecting means with the reference level, and
        means for converting an output of said comparator into the address signal for selecting the kind of said non-linear parameters in said memory means.

6. A noise reducer in accordance with claim 4, wherein
    said memory means stores product data preset corresponding to two kinds of said non-linear parameters,
    said parameter selecting means comprises a comparator for comparing the reference level with the magnitude of the output of said noise detecting means, and
    said memory means receives the output of said comparator as said address signal for selecting the kind of said non-linear parameters.

7. A noise reducer in accordance with claim 2, wherein
    said arithmetic processing means comprises means for subtracting an absolute value of the output of said non-linear processing means from the digital image signal from which noise is not reduced.

8. A noise reducer in accordance with claim 1, wherein
    said digital image signal has a constant level period set to a constant level in every field or in every frame, and
    said noise detecting means detects the magnitude of noise in said constant level period in every field or in every frame.

9. A noise reducer in accordance with claim 8, wherein
    said noise detecting means detects the magnitude of noise in a predetermined period corresponding to said constant level period excluding a start portion and an end portion.

10. A noise reducer in accordance with claim 9, wherein
  said noise detecting means comprises
    level difference between samples arithmetic means for detecting a level difference between said digital image signal and another digital image signal in which said digital image signal is delayed by one sample period, and
    accumulating means for accumulating an output of said level difference between samples arithmetic means over said predetermined period.

11. A noise reducer in accordance with claim 10, wherein
  said accumulating means comprises
    adding means for adding the output of said level difference between samples arithmetic means sequentially for one sample,
    latch means fo latching an output of said adding means, and
    timing control means for starting adding operation of said adding means at a start of said predetermined period and lapching operation of said latch means at an end of said predetermined period.

* * * * *